United States Patent [19]
Mikina

[11] Patent Number: 4,679,838
[45] Date of Patent: Jul. 14, 1987

[54] VEHICLE COLLISION BUMPER

[76] Inventor: Stanley J. Mikina, 4782 Coquina Key Dr., SE., St. Petersburg, Fla. 33705

[21] Appl. No.: 851,208

[22] Filed: Apr. 14, 1986

[51] Int. Cl.⁴ .............................................. E05C 1/02
[52] U.S. Cl. .................................... 293/137; 188/130; 293/102
[58] Field of Search .................. 293/1, 102, 124, 132, 293/135, 136, 137; 188/82.1, 83, 130; 267/139

[56] References Cited
U.S. PATENT DOCUMENTS

| | | | |
|---|---|---|---|
| 1,088,471 | 2/1914 | Sonnichsen | 293/137 |
| 1,390,385 | 9/1921 | Ream | 188/130 X |
| 1,440,081 | 12/1922 | Hutchings | 293/137 X |
| 1,512,917 | 10/1924 | Finizio | 293/137 |
| 1,633,901 | 6/1927 | Ohlendorf | 293/137 |
| 1,709,359 | 4/1929 | Martin | 188/130 |
| 1,808,900 | 6/1931 | Wendell | 188/130 |
| 1,830,418 | 11/1931 | Armstrong | 188/130 |
| 3,311,397 | 3/1967 | Ramsey | 293/137 |

Primary Examiner—Robert B. Reeves
Assistant Examiner—Russell D. Stormer
Attorney, Agent, or Firm—William J. Ruano

[57] ABSTRACT

A non-hydraulic energy dissipating collision bumper that functions with surface-to-surface friction in a stacked assembly of one movable disc or ring interleaved between two stationary discs. This bumper has the optimum characteristic of constant force vehicle deceleration, independent of vehicle velocity, and is also capable of responding to oblique bumper impacts at an angle with respect to a bumper normal. It provides accurate lateral bumper centering with set-up springs, as well as automatic system reset after a collision.

5 Claims, 7 Drawing Figures

VEHICLE COLLISION BUMPER

This invention relates to a vehicle collision bumper.

BACKGROUND OF THE INVENTION

Existing energy absorbing bumpers function in the vehicle speed range of 2½ to 5 miles/hour. They dissipate the vehicle kinetic energy during a collision with a barrier or another vehicle by means of hydraulic shock absorbers. While a 5 mph vehicle speed is small, it represents a sizable vehicle kinetic energy of 2505 ft. lbs, for example—in a 3,000 lb vehicle weight. Such low speed collisions can occur at the end of a braking cycle from a higher speed, or in parking maneuvers, or tight space situations. It is important then to dissipate the remaining vehicle kinetic energy with minimum deceleration to avoid damage to the vehicle frame and body, or to the barrier.

Mathematical analysis indicates that the most efficient bumper is one that provides a constant vehicle decelerating force over its entire working displacement. This then insures that the maximum amount of vehicle kinetic energy is dissipated as heat in the available bumper travel and with the minimum magnitude of decelerating force.

In a hydraulic shock absorber, this optimum characteristic can be obtained by biasing the pressure relief valve in the absorber piston or cylinder by means of a constant force spring that opposes the valve opening. However, since the optimum vehicle retarding force is a constant one independent of vehicle velocity, there is really no necessity to create this force by hydraulic means. Hydraulic shock absorbers are only necessary whenever the energy dissipating force must be modulated to be some function of the oscillation velocity, as in damping of the vehicle oscillations on its support springs.

On the basis of these considerations, for the constant force collision bumper, the present invention relates to an alternative mechanism that does not require any hydraulic means for creating an energy absorbing force opposing a collision displacement. This mechanism produces a substantially constant vehicle retarding force that is independent of vehicle velocity, as required for the optimum characteristic, and which results in a minimum peak deceleration for a given vehicle stopping distance.

SUMMARY OF THE INVENTION

In accordance with this invention, substantially constant vehicle deceleration is obtained during a low speed collision by means of surface-to-surface dry friction forces developed between rubbing areas in a clamped stacked assembly of interleaved plates. One set of stationary plates or discs is bolted to a support bracket on the vehicle frame, while the interleaved movable plate or disc is activated by the bumper displacement by means of a lever and a ratchet and spring mechanism. The movable disc member can be in the form of a ring. The impact of a collision against the bumper body causes the resulting bumper displacement to be converted to a slipping rotation of the movable disc by means of a ratchet member engaging teeth on the periphery of the interleaved movable disc or ring. The ratchet mechanism also enables quick and automatic reset of the bumper mechanism to take place after the vehicle rebounds from the collision. Included in the invention is a lateral bumper centering means that makes the bumper function even for oblique impacts at an angle with respect to a normal to the bumper. This means utilizes springs with initial set-up forces for more accurate positioning of the bumper before or after a collision.

BRIEF DESCRIPTION OF THE DRAWINGS

For a better understanding of this invention and its method of operation, together with additional objects and advantages thereof, reference is made to the following description taken in connection with the accompanying drawings in which.

DETAILED DESCRIPTION OF THE PREFERRED EMBODIMENT

Figure 2:
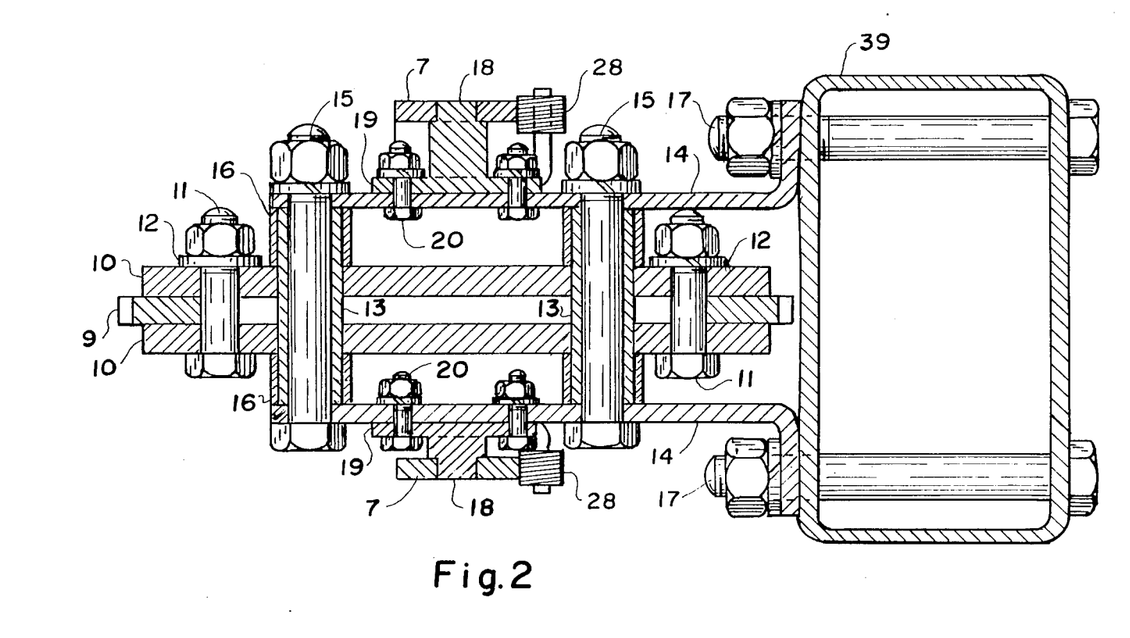
FIG. 2 is a vertical cross-sectional view along section 2—2 in FIG. 1. This shows the interleaved disc assembly with two stationary discs squeezing the interleaved movable disc ring by means of clamping bolts. These clamping bolts also serve as bearings that guide the slip rotation of the central disc ring. The entire disc assembly is supported by two vertical tubular members that are clamped to a vehicle frame bracket by two large vertical bolts that also serve as keys for preventing rotation of the two stationary discs. The two large horizontal bolts are part of a set of four bolts that attach the disk support bracket to the vehicle frame beam and serve to transmit the vehicle retarding forces from the friction elements and bumper to the vehicle frame.
Figure 3:
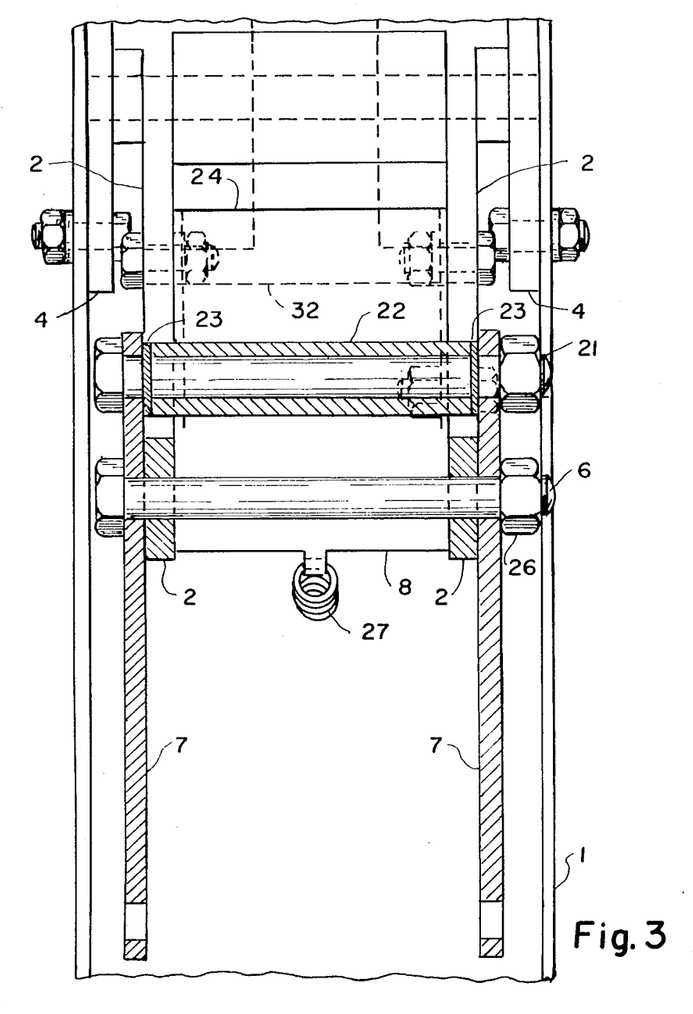
FIG. 3 is a sectional view along line 3—3 of FIG. 1 and shows the ratchet support bolt and pivoted radial arms for guiding the ratchet bolt, and the bars or links from the ratchet guide arms to the link pivot at the bumper.
Figure 4:
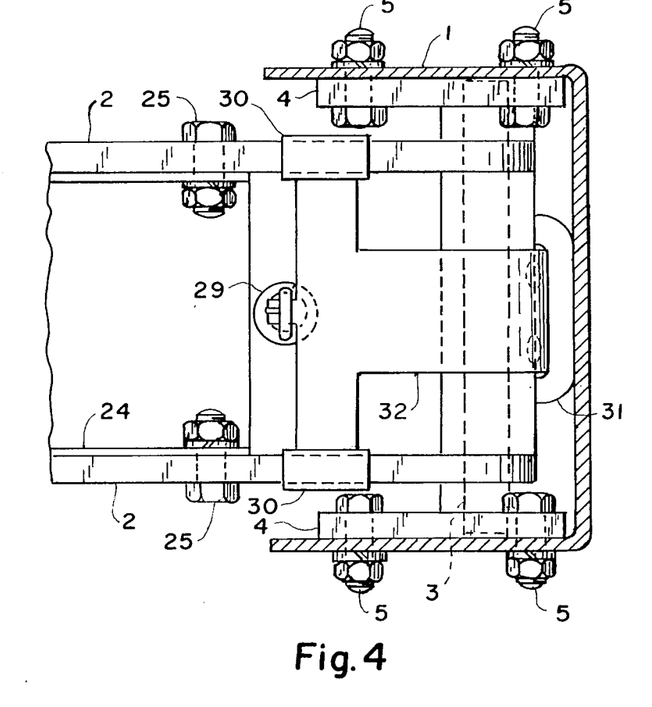
FIG. 4 is a view in the direction 4—4 of FIG. 1, showing details of the lateral bumper centering system inside the bumper beam.
Figure 5:
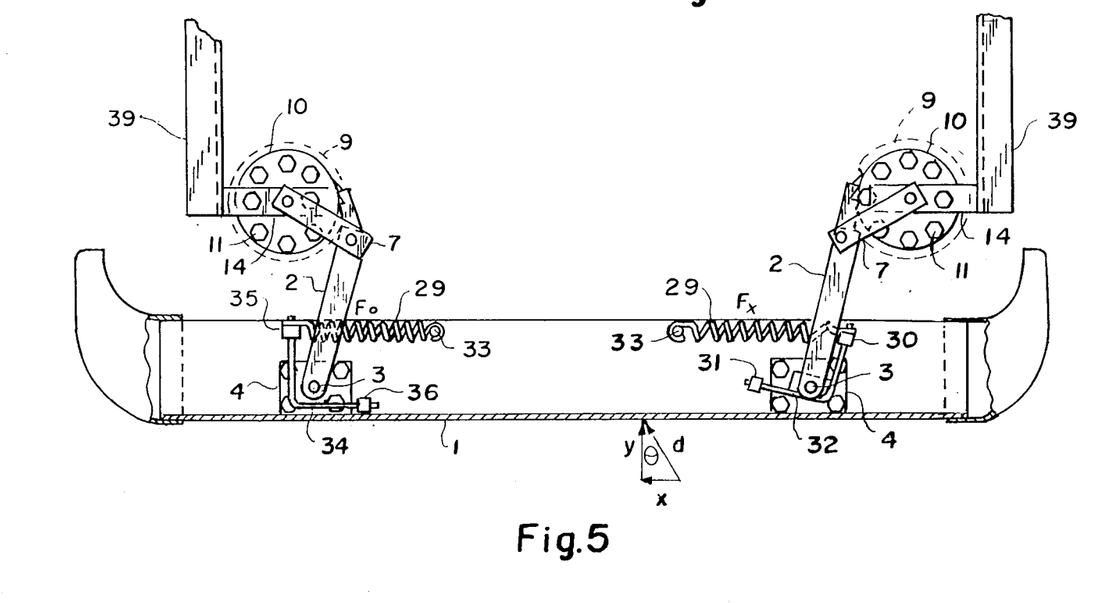
FIG. 5 is a plan or top view of the entire bumper system and shows the displacement of the mechanism parts for a collision impact occurring at an angle with respect to the longitudinal axis of the vehicle.

The mechanism shown in FIGS. 1 to 7 consists of a bumper beam, or bumper 1 which may be for either the front or rear of a vehicle, or both, and of the following attachments thereof and to the vehicle frame. In a frontal collision, for example, the resulting displacement of bumper 1 along the y axis (FIG. 1) is transmitted to the energy dissipating frictional assembly by means of links 2 which are pivoted around a vertical axis on pin 3 or pivot bolt that is supported on bearing flanges 4 (FIG. 5). The flanges 4 are bolted to bumper beam 1 by means of attachments 5 (FIG. 4). The other end of links 2 transmits their force through a pivot bolt 6 (FIG. 3) on radius arms 7. Pivot bolt 6, in turn, transmits its force to ratchet member 8 (FIG. 1), which engages toothed ring 9 in a direction to cause a slip rotation of ring 9 relative to the stationary discs 10 whenever the torque applied by ratchet 8 exceeds the slip torque of the friction assembly.

Figure 1:
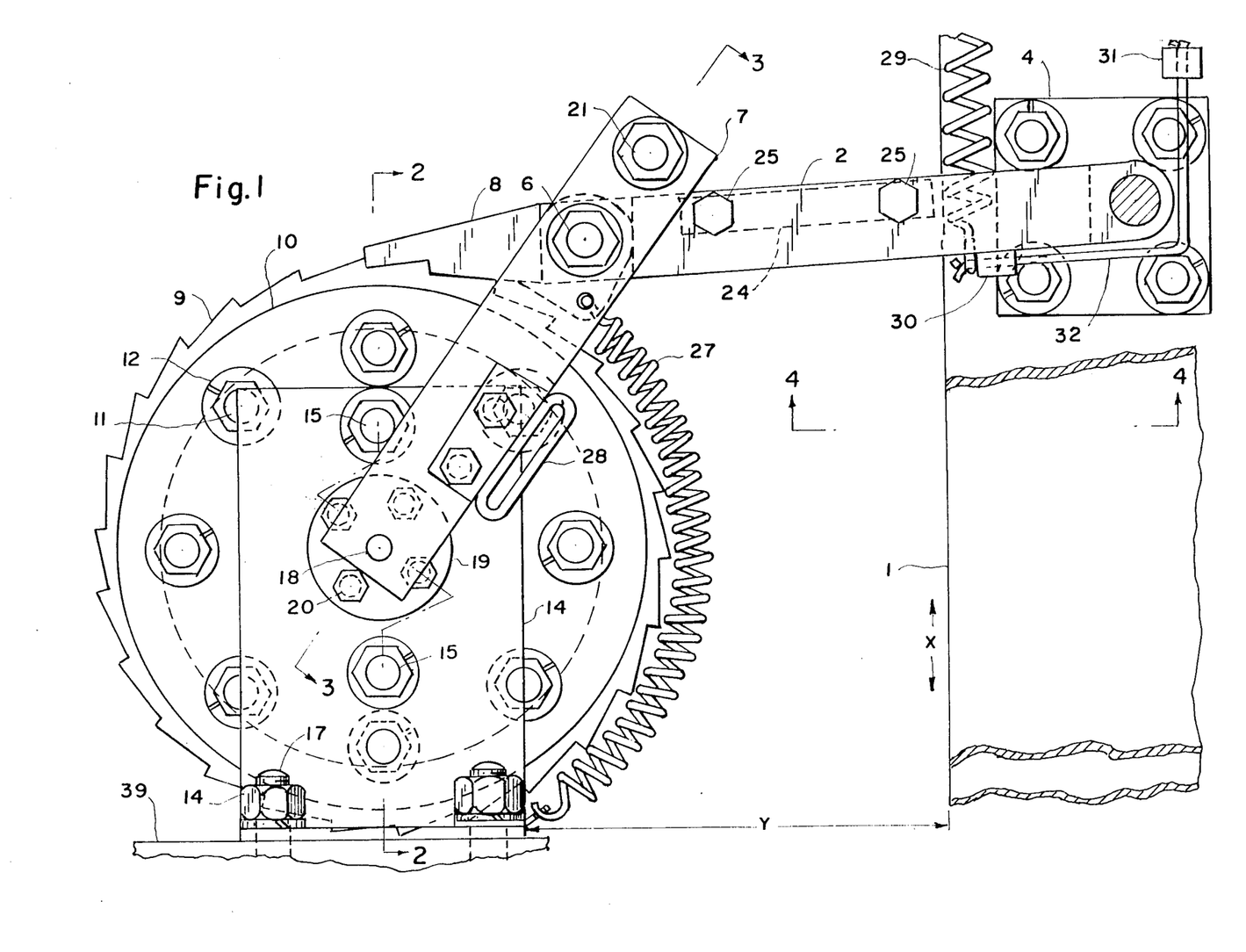
FIG. 1 is a plan or top view of the friction disc assembly and ratchet actuating means embodied in accordance with this invention. Included in this figure are the ratchet biasing and bumper reset spring, together with the bumper lateral centering spring with set-up for accurate lateral centering.

For stopping distances of the order of 4 inches from a speed of 5 mph, the force exerted by ratchet 8 is 3750 lbs. at each end of the bumper for a 3000 lb. vehicle, for example. For this loading, the contact stress at the ratchet teeth can be made acceptable by letting the ratchet 8 engage two teeth simultaneously on toothed ring 9. With reasonable accuracy in tooth spacing, equal load division between the teeth is assured by plastic deformation of the metal in ratchet 8 and ring 9 during the first collision impact.

The comparatively large slip torque of toothed ring 9 is predetermined by means of bolts 11 (FIGS. 2 and 5) that clamp stationary discs 10 against toothed ring 9. Calibrated spring washers 12 and nut tightening with a torque wrench assure that the required slip torque of ring 9 with respect to disc 10 is obtained. Since the slip torque depends on the surface friction between the discs and ring as well as on the clamping bolt forces, it is important to protect the disc and ring faces against corrosion to maintain substantially constant coefficients of friction between the rubbing surfaces over the life of the unit. This can be done, for example, by zinc plating or galvanizing the required areas. After assembly, the entire unit can be rust-proofed with an asphalt type paint.

The plurality of clamping bolts 11 also serve as guide bearings for friction ring 9. The friction forces between the bolt body and the inner surface of ring 9 are small compared to the friction forces between ring 9 and discs 10 but are proportional to the latter—thus, they simply are added to the latter to obtain the required resultant slip torque.

Discs 10 are slidably supported on tubular spacers 13 (FIG.2) which are clamped to bracket 14 by bolts 15. Sleeves 16 position the disc 10 assembly slidably on spacers 13 with a small axial clearance to prevent bolt 15 forces from affecting the slip torque calibration at the discs. The entire frictional absorber assembly is attached to the vehicle frame member 39 by means of bolts 17.

Radius arms 7 are pivoted on shafts 18, or pivots, which are mounted on bracket 14 by flanges 19 and bolts 20. Arms 7 serve not only as guides for ratchet 8 and links 2, but also as means for supporting the weight of the bumper assembly 1. Therefore, additional means must be provided for enabling the links 2 and arms 7, which form rectangles in the vertical planes, to carry the bumper weight without distorting the rectangles into parallelograms. Accordingly (FIG. 3), arms 7 are clamped at one end by means of bolt 21 against a tubular spacer 22. Resistance to torque loads around the bolt 21 axis is further enhanced by means of twisted-tooth washers 23 at each end of spacer 22. This enables the arm 7 rectangle to resist the moment of the overhanging bumper 1 weight without distortion. Bolt 6 cannot aid bolt 21 in this function because ratchet 8 and links 2 must be free to rotate about the bolt 6 axis. Bolt 6 is therefore maintained as a pivot rather than a clamping member by means of an untightened lock nut 26.

The rectangle of links 2 is enabled to carry the vertical bumper weight without distortion into a parallelogram by means of a stiffening member 24 that ties the two links 2 together in a vertical plane. Flanged member 24 is attached to links 2 by means of bolts 25.

In operation (FIG. 1), a bumper collision displacement "y" equal to 4 inches, for example, causes radius rods 7 to rotate counterclockwise about pivot 18 to a negative angle from the vertical plane equal to the initial positive angle. At the same time, toothed ring 9 is rotated through the same angle by ratchet 8, and a biasing helical spring 27 is stretched over the periphery of ring 9. At the end of the bumper permissible travel, the ultimate bumper stop is, of course, in contact with the vehicle frame, either metal-to-metal or through a rubber buffer.

The selected simple geometry of radius arm 7 and links 2 imposes a penalty on the constancy of the shock absorber slip force as reflected at the bumper. This is due to the variation in the radius of the line of action of links 2 relative to pivot 18, or shaft, over the range of angular travel of arms 7. However, this penalty is not great, amounting only to a deviation of ±8% from the mean slip force at the bumper for the design proportions shown in FIG. 1.

Figure 7:
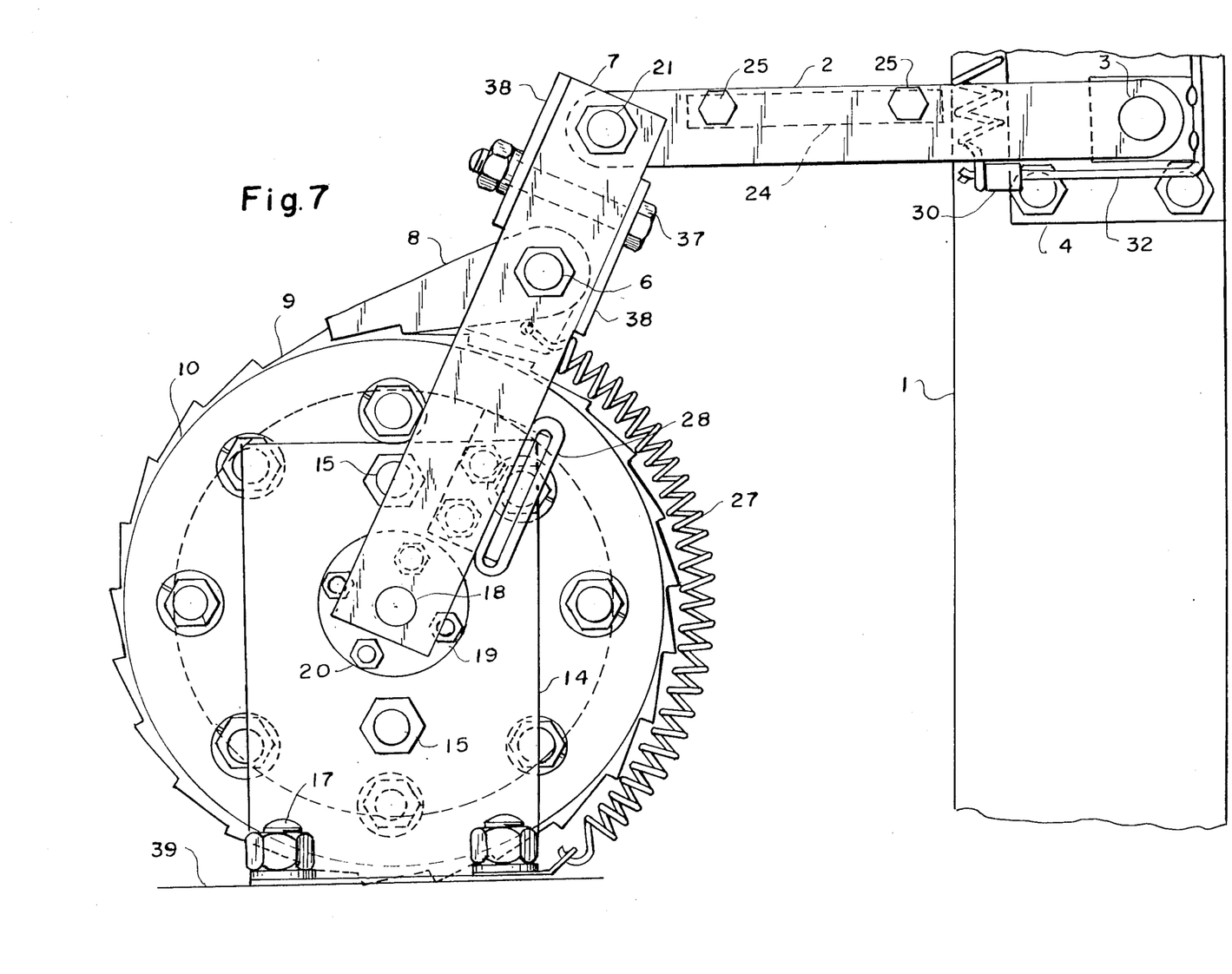
FIG. 7 is a modification similar to FIG. 1 with the exception that the bumper links engage the radius arm at the largest possible radial distance from the friction disc axis while the ratchet remains at the same pivot as in FIG. 1. This change reduces the inherent variation in bumper slip force with bumper collision displacement as a result of the system geometry.

The slip force variation can easily be reduced to ±3.5% by the embodiment of FIG. 7. In this, links 2 engage radius arm 7 at a greater radius from pivot 18, namely at bolt 21, while ratchet member 8 remains at pivot bolt 6. Flat plates 38 are clamped to the sides of arms 7 by means of bolt 37 and serve to stiffen the structural rectangle of arms 7 to enable it to carry the overhung bumper weight without distortion of the structural rectangle into a parallelogram.

In FIGS. 1 and 7, spring 27 serves a double purpose. First, it biases ratchet member 8 into engagement with the teeth on ring 9, and second, it provides a restoring force for resetting the system to its initial position as the vehicle rebounds from the collision. The reset displacement of arms 7 is cushioned by rubber stops 28 attached to bracket 14.

Since the bumper beam is supported by vertical pivot bolts 6 and 3 on radius arms 7 and links 2, respectively, bumper beam 1 could be free to move laterally on these pivots if no restraints were provided. Centrifugal forces, in a turn, or during lane changing, could displace the bumper laterally to the end of its travel without such restraints. The required bumper lateral positioning system must accurately center the bumper with respect to the vehicle frame and allow no lateral bumper displacements for all possible centrifugal forces. At the same time, when such forces are exceeded in a collision situation, the bumper centering system must allow the bumper to be deflected laterally for impacts occurring at an angle with respect to the vehicle longitudinal axis. The resulting bumper displacement then (FIG. 5) has a longitudinal component "y" parallel to the long axis of the vehicle plus a lateral component "x" equal to y tan $\theta$, where $\theta$ is the collision angle with respect to the long or longitudinal axis of the vehicle. This relation follows from the fact that the friction forces between the bumper and the colliding obstacle are usually greater than the bumper spring centering forces so that no slippage occurs between bumper and colliding obstacle during the impact. Since the slip force at each end of the bumper is the same, the longitudinal displacement "y" of the bumper will be the same at each end whenever the rate of change of the vehicle momentum produces a force at each end of the bumper that is in excess of the shock absorber slip force.

After vehicle rebound, the bumper is returned to its normal position along the longitudinal axis of the vehicle by biasing helical springs 27 acting around the axis of the disc stack assembly. Ratchet 8 allows this bumper return as it rides over the tops of the teeth on ring 9 in the reverse direction.

As for the lateral centering of the bumper before or after a collision, this is accomplished by means of horizontal springs 29 which are parallel to the bumper and which are set-up with large initial forces at zero bumper lateral displacement. Details of the set-up enabling system are shown in FIGS. 1, 3, 4, 5, and 6.

There are two springs 29, one at each end of the bumper, to take care of right or left bumper displacements. For example—in FIG. 5, there is shown a bumper collision displacement to the left of the vehicle frame. In that case, the right hand spring 29 is stretched as links 2 cause rubber stops 30 to be deflected clockwise while rubber stop 31 is lifted out of contact with bumper 1. The angle bracket 32 that supports both 30 and 31 is pivoted on pivot bolt 3 attached to bumper 1. The force $F_x$ of the stretched spring 29 is applied to anchor pin 33 on bumper 1 and acts in a direction to the right so as to oppose the bumper displacement to the left and, thus, to restore the bumper to its pre-collision position when the bumper rebounds from the collision barrier. This restoration occurs via a straightening mement on links 2 due to the force of spring 29 on stop 30 and its reaction force on pivot bolt 3.

While the right hand spring 29 is being stretched in this example, the left hand spring 29 is completely inert and undeflected. However, it has a large set-up force $F_o$ that acts internally between bumper 1 and angle bracket 34. The force $F_o$ is transmitted to stop 35 and then via pivot 3 to the stop 36 which prevents rotation of bracket 34 on pivot shaft 3. This large internal set-up force is then available for accurately defining the lateral position of the bumper as the right hand spring 29 moves the bumper to its original position to the right after rebound from the collision.

Figure 6:
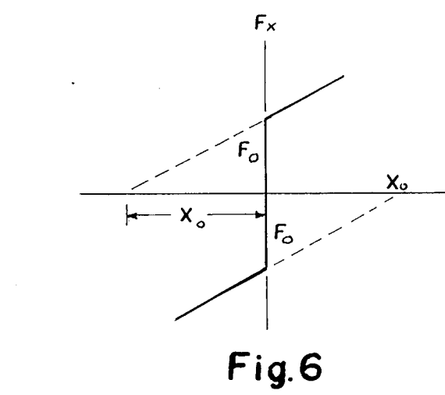
FIG. 6 is a force-displacement diagram for the bumper centering springs shown in FIG. 5. It illustrates the superiority of the springs with set-up as a means for accurately positioning the bumper beam relative to the vehicle frame after a collision.

The centering characteristic of the set-up springs is shown in FIG. 6, where the lateral spring force $F_x$ is plotted as a function of bumper displacement X. At zero displacement, the centering spring force is $F_o$ for both springs and gives accurate centering of the bumper in its initial undeflected position. The functions of the right and left hand springs are interchanged for a bumper deflection to the right. In FIG. 6, $X_o$ represents the initial stretch of springs 29 to obtain the set-up force $F_o$.

While the discs have been described as flat, they may be corrugated instead.

While I have illustrated and described a single specific embodiment of my invention, it will be understood that this is by way of illustration only and that various changes and modifications may be contemplated in my invention and within the scope of the following claims.

I claim:

1. In a vehicle collision bumper, the combination of a stacked assembly of frictionally engaged discs on each side of a toothed ring, a ratchet member engaging said toothed ring, with said ratchet member guided by a pair of radius arms pivoted on the disc axis, links connecting the radius arms with the bumper, with said links pivoted at the ratchet pivot at one end and at a parallel pivot on the bumper at the other end, the link connection at the bumper including means for automatically engaging or disengaging the links from centering springs that are adapted for biasing said links with said set-up forces, with aforesaid set-up springs establishing a link centering moment due to the set-up spring force acting in conjunction with the reaction on the link pivot at the bumper, a similar set-up spring system at each end of the bumper, a reset spring on the disc axis also biasing the ratchet member into engagement with the toothed ring, with said reset spring also biasing the radius arms and connected bumper links for return to their initial position after a collision.

2. The combination recited in claim 1 with the bumper links engaging the radius arms at a pivot on a bearing bolt at a greater radius than the ratchet pivot radius with respect to the disc axis, with means added for enabling the structural rectangle of radius arms to carry the bumper weight without distortion of the rectangle due to twist of one radius arm relative to the other.

3. The combination recited in claim 2 wherein said means added for enabling the structural rectangle of radius arms to carry the bumper weight without distortion of the rectangle due to twist of one radius arm relative to the other comprises flat plates bolted to the sides of the radius arms for preventing twist of the radius arms about the pivots at each end of the radius arms.

4. The combination recited in claim 1 wherein the toothed ring is guided rotationally about the disc axis by the bolts that clamp the non rotating discs to the movable ring.

5. The combination recited in claim 4 wherein said stationary friction discs are axially mounted on long spacers that prevent their rotation, with short spacer sleeves on each side allowing vertical clearance on these spacers to isolate the disc clamping forces from the bolting forces of the long spacers.

* * * * *

UNITED STATES PATENT AND TRADEMARK OFFICE
CERTIFICATE OF CORRECTION

PATENT NO. : 4,679,838

DATED : July 14, 1987

INVENTOR(S) : Stanley J. Mikina

Page 1 of 2

It is certified that error appears in the above-identified patent and that said Letters Patent is hereby corrected as shown below:

The title page should be deleted to appear as per attached title page.

Signed and Sealed this

Second Day of February, 1988

Attest:

DONALD J. QUIGG

Attesting Officer

Commissioner of Patents and Trademarks

United States Patent [19]
Mikina

[11] Patent Number: 4,679,838
[45] Date of Patent: Jul. 14, 1987

[54] VEHICLE COLLISION BUMPER

[76] Inventor: Stanley J. Mikina, 4782 Coquina Key Dr., SE., St. Petersburg, Fla. 33705

[21] Appl. No.: 851,208

[22] Filed: Apr. 14, 1986

[51] Int. Cl.⁴ .............................................. E05C 1/02
[52] U.S. Cl. ..................................... 293/137; 188/130; 293/102
[58] Field of Search ............... 293/1, 102, 124, 132, 293/135, 136, 137; 188/82.1, 83, 130; 267/139

[56] References Cited

U.S. PATENT DOCUMENTS

| | | | |
|---|---|---|---|
| 1,088,471 | 2/1914 | Sonnichsen | 293/137 |
| 1,390,385 | 9/1921 | Ream | 188/130 X |
| 1,440,081 | 12/1922 | Hutchings | 293/137 X |
| 1,512,917 | 10/1924 | Finizio | 293/137 |
| 1,633,901 | 6/1927 | Ohlendorf | 293/137 |
| 1,709,359 | 4/1929 | Martin | 188/130 |
| 1,808,900 | 6/1931 | Wendell | 188/130 |
| 1,830,418 | 11/1931 | Armstrong | 188/130 |
| 3,311,397 | 3/1967 | Ramsey | 293/137 |

*Primary Examiner*—Robert B. Reeves
*Assistant Examiner*—Russell D. Stormer
*Attorney, Agent, or Firm*—William J. Ruano

[57] ABSTRACT

A non-hydraulic energy dissipating collision bumper that functions with surface-to-surface friction in a stacked assembly of one movable disc or ring interleaved between two stationary discs. This bumper has the optimum characteristic of constant force vehicle deceleration, independent of vehicle velocity, and is also capable of responding to oblique bumper impacts at an angle with respect to a bumper normal. It provides accurate lateral bumper centering with set-up springs, as well as automatic system reset after a collision.

5 Claims, 7 Drawing Figures